Patented Feb. 24, 1925.

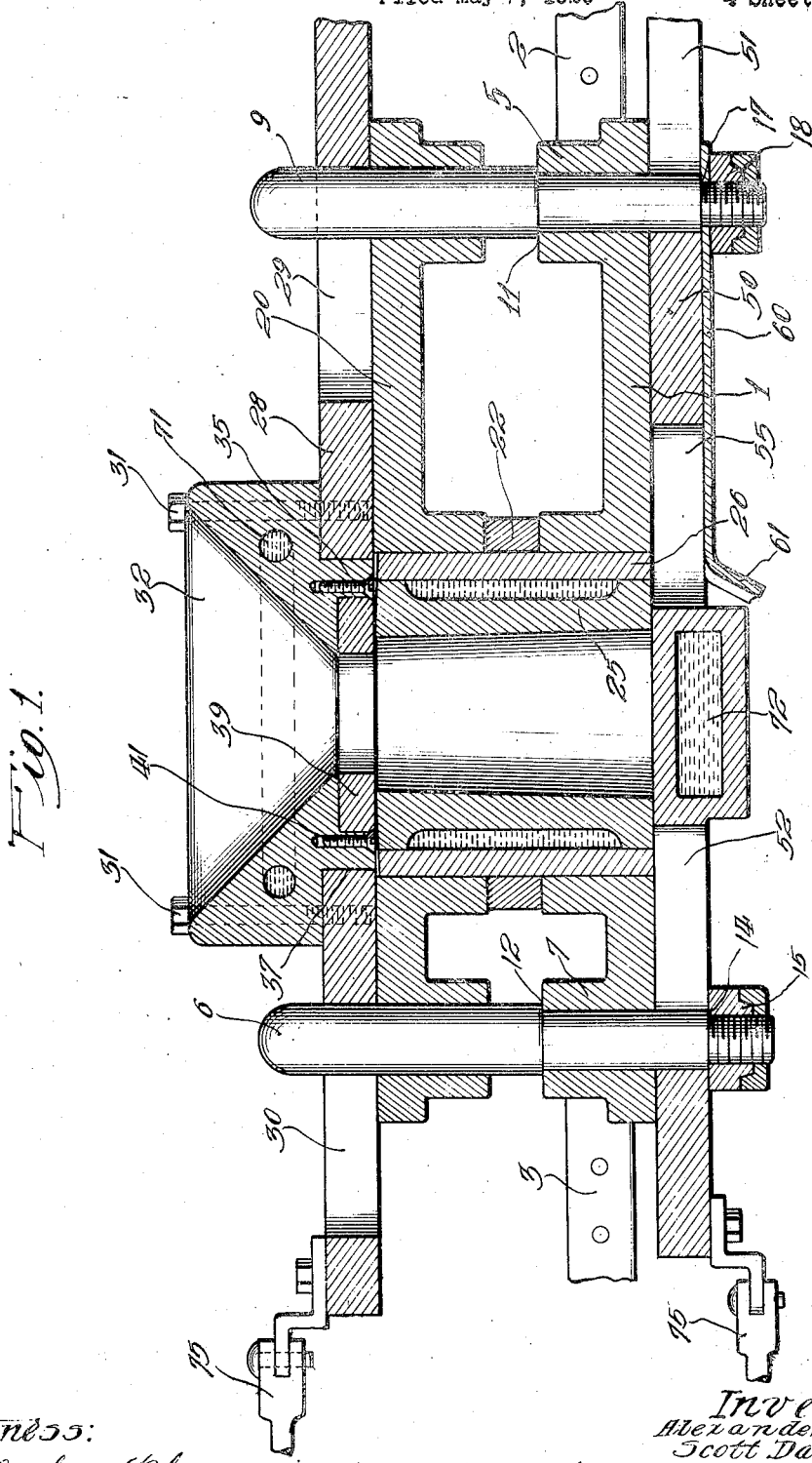

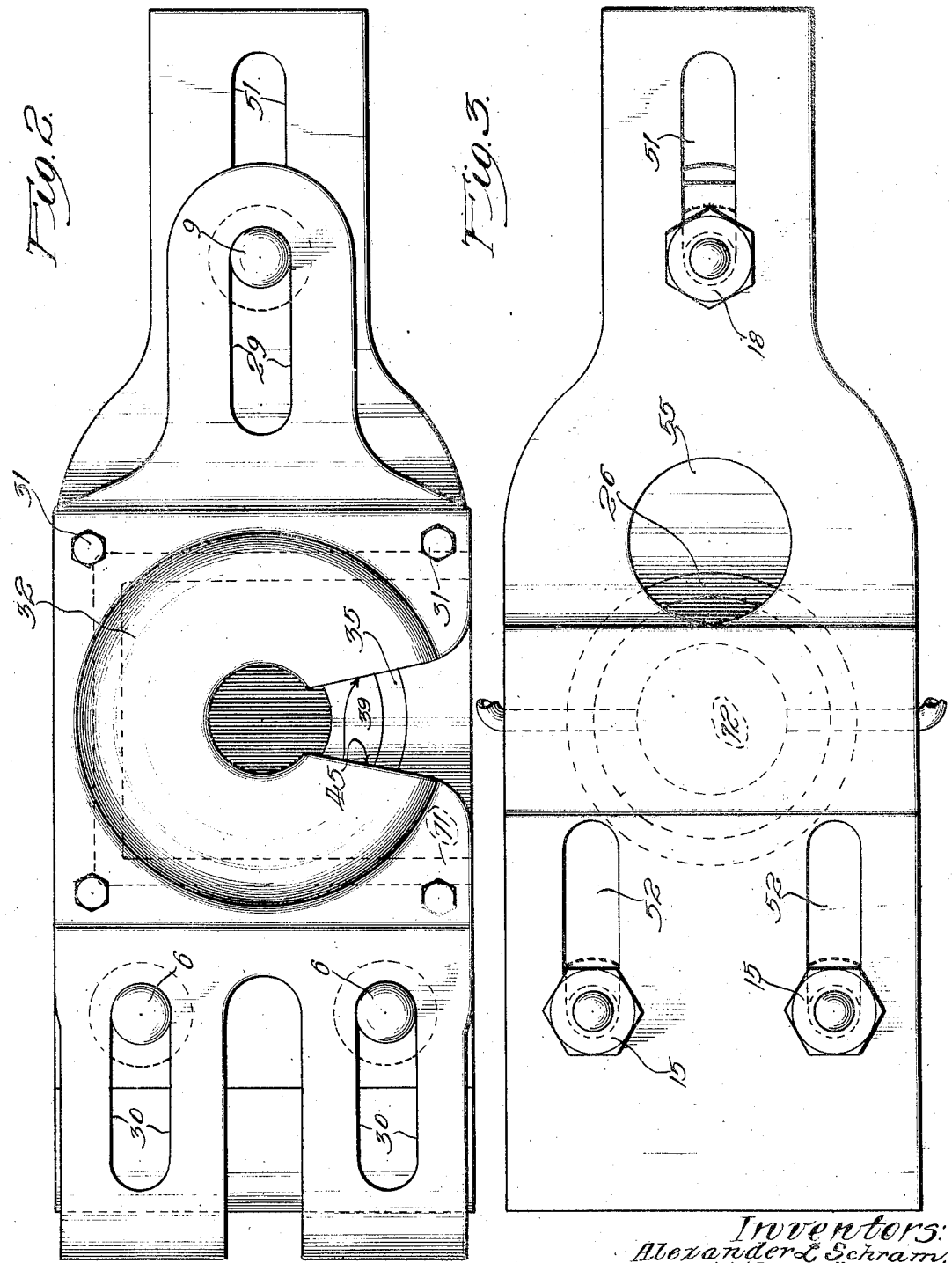

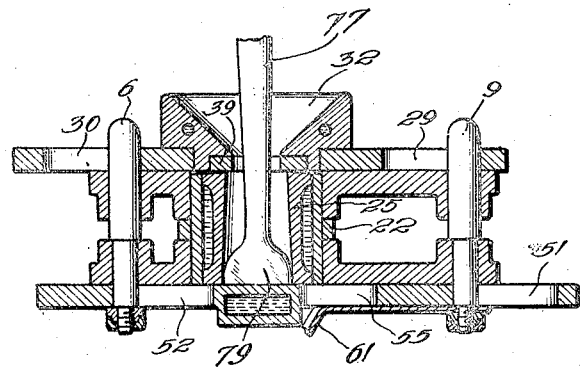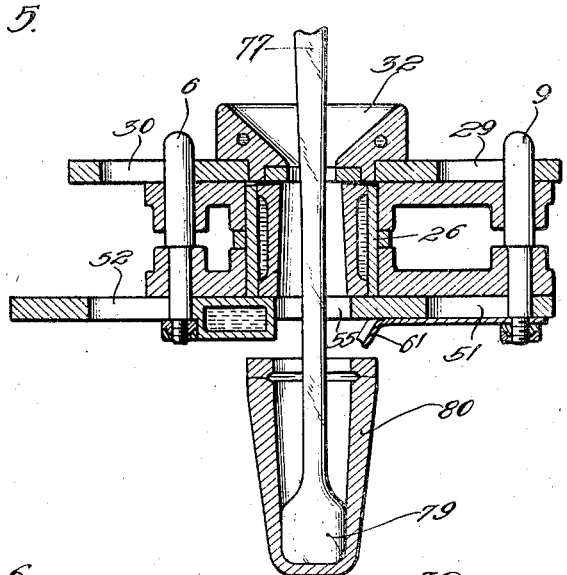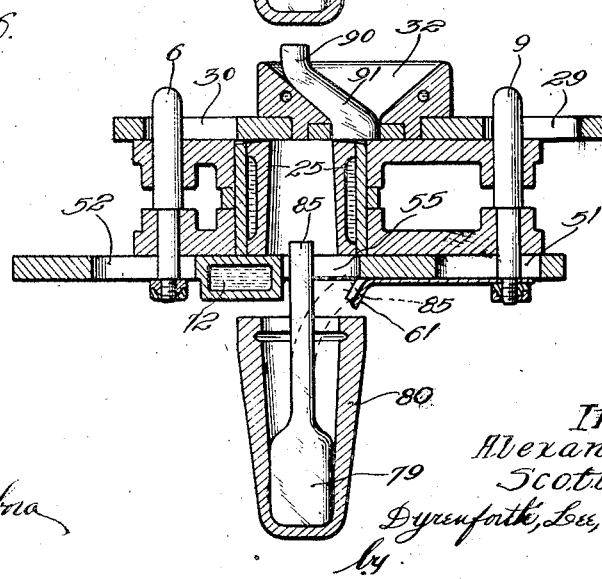

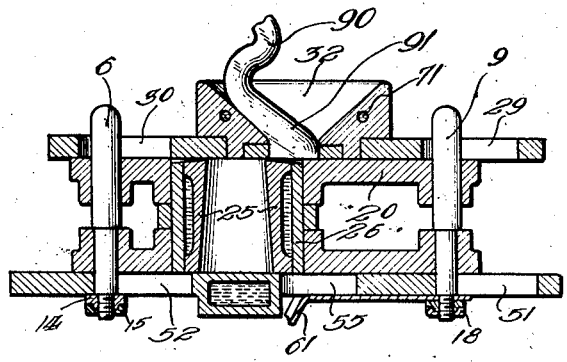
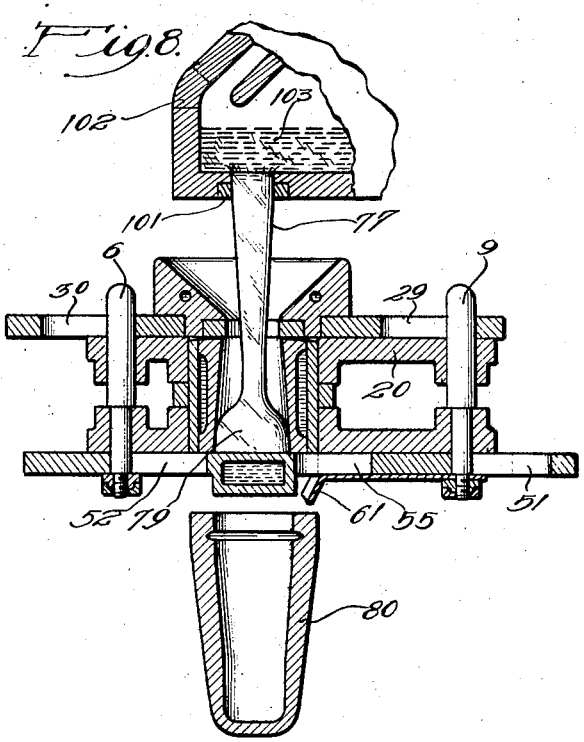

1,527,708

UNITED STATES PATENT OFFICE.

ALEXANDER L. SCHRAM AND SCOTT DAVIDSON, OF HILLSBORO, ILLINOIS, ASSIGNORS TO SCHRAM GLASS MANUFACTURING COMPANY, OF ST. LOUIS, MISSOURI, A CORPORATION OF MISSOURI.

METHOD OF AND DEVICE FOR CUTTING AND SHAPING MOLTEN MATERIAL.

Application filed May 7, 1920. Serial No. 379,505.

*To all whom it may concern:*

Be it known that we, ALEXANDER L. SCHRAM and SCOTT DAVIDSON, citizens of the United States, residing at Hillsboro, in the county of Montgomery and State of Illinois, have invented new and useful Improvements in Methods of and Devices for Cutting and Shaping Molten Material, of which the following is a specification.

This invention relates to improvements in method of and devices for cutting and shaping molten material and is especially adapted for use in connection with the manufacture of fruit jars and other glass articles where the molten glass flows in a continuous stream from a furnace and must be fed into a series of molds placed in rotation under the outlet.

In the manufacture of glass articles in this manner it is necessary, or desirable, to allow a certain amount of the molten glass to flow into a receptacle having substantially the same shape as a mold, in order to give the glass a preliminary shaping so that it will better conform to the mold as it drops therein. This preliminary shaping forms a lump or pellet of soft glass of sufficient size to give the mold its complete charge; or the pellet may make merely a partial charge, the balance being supplied by allowing additional molten glass to flow from the furnace directly into the mold.

After a full charge has been supplied to the mold, the stream of flowing molten glass must be cut and the depending end supported in order to permit the charged mold to be moved away and an empty one to take its place. This is a difficult step in the process since the molten glass is issuing continuously from the furnace, forming a viscous stream that must be cut by a quick shearing operation. While the molds are being changed the cut end of the stream must be supported without being allowed to cool to such an extent as to solidify; and then permitted to flow into the shaping receptacle to form a new pellet. In order to prevent undue cooling of the stream, and to prevent curling, doubling, or lapping of the stream, after it has been cut, while the depending end is being supported, it is desirable to make the cut as near to the furnace outlet as possible, since the stream at this place is larger in diameter and hotter.

Among the objects of our invention is the provision of a device that will give a preliminary shaping to a pellet of molten glass, drop the same into a mold, allow additional glass to run from the furnace directly into the mold if desired, cut the stream issuing from the furnace close to the outlet, support the depending end to permit a change of molds without causing the stream to double, curl, or lap, and without cooling it to such an extent as to cause it to solidify, and then allow the stream again to run into the shaping receptacle.

Our device is so made that its operation may be varied so that it will measure out a pellet constituting a full charge for a mold, or permit additional glass to flow into the mold after the pellet has been deposited therein. Other variations in the operation and timing of our device are possible as will be explained more fully hereinafter.

In that form of device embodying the features of our invention shown in the accompanying drawings, Figure 1 is a vertical sectional view of our improved device. Figure 2 is a top plan view. Figure 3 is a bottom plan view with the guiding plate removed. Figures 4 to 8, inclusive, are diagrammatic views showing different positions of our device during operation.

As shown in said drawings, 1 indicates a flat plate, substantially rectangular in shape suitably supported at its ends by means of the brackets 2 and 3 in any suitable manner, so that its center part will lie below the furnace outlet from which molten glass is issuing, or so that it readily may be moved into this position. One end of the plate 1 is provided with two drilled bosses, 7, 7, in which are mounted the vertically projecting headless bolts 6. The other end of the plate 1 has a single similar boss 5 with a similar upwardly projecting headless bolt 9. The bolts 6 and 9 are provided with shoulders 12 and 11, respectively, adapted to rest on the upper ends of the bosses 7 and 5. The lower end of the bolt 9 is provided with a shoulder 17 and its end threaded in order to receive a nut 18 adapted to be set up against the shoulder 17. The lower ends of the bolts 6 are likewise provided with shoulders 14 and nuts 15. The upper ends of the bolts 6 and 9 above the shoulders 12 and 11 are adapted to receive a plate 20 the same in shape as plate 1, but placed in an inverted position. The plates 20 and 1 are suitably spaced apart by means of the ring-shaped bushing 22. In the center of each of the plates 1 and 20 is provided a large circular hole adapted to receive a substantially cylindrical shaping receptacle 25 with its water jacket 26.

Resting on the top of the plate 20, and adapted for endwise sliding movement, lies a cutting plate 28, provided with slots 30 and 29 adapted to guide it on the upper ends of the bolts 6 and 9, respectively. The cutting plate 28 is provided near its center with a circular opening 37 adapted to lie directly over the shaping receptacle 25 when the plate 28 has been moved to the extreme left, as shown in Figure 1.

Mounted on the plate 28, by means of the machine screws 31, is a rectangular shaped member 32 with a circular funnel-shaped opening. The bottom part of the member 32 has a circular depending flange 35 extending downwardly in the circular opening 37 in the plate 28. The circular flange 35 is provided on its inner edge with a counter-sunk circular ring, or cutting member, 39, held in position by the counter-sunk overlapping heads of machine screws 41, 41, threaded upwardly into the member 32. The circular funnel-shaped opening in the part 32 is cut away at one side as indicated by 45, for a purpose to be explained hereinafter.

Near the lower ends of the bolts 6 and 9 is provided a bottom plate 50 adapted for endwise sliding movement similar to the plate 28, and provided with slots 52 and 51 for the purpose of guiding it on the bolts 6 and 9, respectively. The plate 50 is held in contact with the bottom surface of the plate 1 by means of the nuts 18 and 15, but is mounted loosely enough to permit the sliding movement above referred to. The plate 50 is also provided near its center part with a circular opening 55 slightly larger in size than the bottom end of the opening in the shaping receptacle 25 and so located in the plate 50 that when said plate is at the extreme end of its movement to one side, said opening 55 will register with the opening in the shaping receptacle 25, and when it is at the opposite end of its movement the bottom of said opening in the shaping receptacle will be entirely closed. The plate 50 is shown in Figure 1 at the limit of its movement to the right, and when in this position the bottom of the shaping receptacle is closed.

Directly below the plate 50, mounted on the bolt 9, and held in position by the nut 18 against the shoulder 17 is a thin guiding plate 60 extending inwardly to a point below the side of the shaping receptacle 25, with its end bent downwardly as indicated by 61. The purpose of this guiding plate will be explained more fully hereinafter.

The member 32 is provided with a port 71 adapted to contain water for cooling. The plate 50 is also provided with a chamber 72 adapted to contain water for the same purpose. Any suitable means may be provided for circulating water in said port and chamber and also between the shaping receptacle 25 and its water jacket 26. The provision of water jackets in this manner for cooling parts is old in the art and forms no part of the present invention.

It will be noted that the cylindrical opening in the shaping receptacle 25 is slightly tapered, with its smaller end at the top in order to facilitate the discharge of a glass pellet from its lower end into a mold.

To one end of each of the plates 28 and 50 is attached the end of a rod 75, by means of which the plates may be given a reciprocal sliding movement. We have not shown any particular means for actuating the rods 75, since any convenient method may be employed. For example, they may be manually operated, connected with pistons operating in cylinders with fluids under pressure, or connected to electromagnetic devices.

In the operation of our improved device, it is placed so that the shaping receptacle 25 will be located directly below the opening 101 in the furnace 102 from which a molten stream of glass 77 is issuing. (See Fig. 8.) The molten glass in the furnace in indicated by 103. In properly placing the device in the first instance it is moved toward the stream of glass so that the stream may enter the funnel-shaped opening in the member 32 on the side where it is cut away as indicated by 45. The purpose of this cut-away part is to so permit the proper placing of the device.

In Figure 4 the device is shown properly placed with the bottom plate to the limit of its movement to the right with the shaping receptacle closed at the bottom; and the cutting plate 28 at the limit of its movement to the left, with the funnel-shaped opening directly over the shaping receptacle. The glass stream 77 is shown flowing through the opening in the plate 28 into the shaping receptacle 25, and commencing to form a glass pellet 79. After the glass pellet 79 has attained the desired size, the bottom plate 50 is moved to the extreme left, as shown in Figure 5, so that the opening 55 will register with the opening in the shaping receptacle, permitting the pellet 79 to drop from the shaping receptacle into the mold 80 which has been placed directly below. If the pellet 79 formed in the shaping receptacle has not attained a sufficient size to furnish a complete charge to the mold 80, the plates 28 and 50 are left in the positions shown in Figure 5, so that additional glass may flow from the furnace directly into the mold 80 until a complete charge has been obtained. As soon as the mold 80 has been fully charged, the cutting plate 28 is moved to the right, as shown in Figure 6, the cutting ring 39 cutting or shearing the glass stream 77 with the upper edge of the shaping receptacle 25. As shown in Figure 6, the cutting plate 28 has been moved to the extreme end of its movement and the stream 77 has been cut. The plate 28 remains in the position as shown in Figure 6 until the end of the glass stream below the cut, as indicated by 85, has fallen down through the device and into the mold 80. As shown in Figure 6, the end 85 is just leaving the bottom of the shaping receptacle 25. The plate 28 is still held in the position shown in Figure 6 until the end 85 of a glass stream has fallen below the plate 50 and the plate 50 has been moved to the right to the position shown in Figure 7 to close the bottom of the shaping receptacle. While the end 85 is falling through the device into the mold, and while the plate 50 is being moved to the right to close the bottom of the shaping receptacle, the depending end of the glass stream is supported by the member 32, and during this time it will commence to bend, as indicated by 90. The movement of the parts is so rapid, however, and the cutting of the stream 77 is so close to the outlet from the furnace, where the stream 77 is thick, that the stream will merely bend, as indicated by 90, but will not actually double, curl, or lap on itself.

As soon as the shaping receptacle has been closed at the bottom, as shown in Figure 7, the cutting plate 28 is again quickly moved to the left to the position shown in Figure 8, thus allowing the depending end of the stream 91 again to fall into the shaping receptacle and commence the formation of a new pellet 79.

During the formation of the new pellet, a new empty mold is placed below the device.

Since the depending cut end of the glass stream 91 cannot be supported for a great length of time without causing curling or lapping, the parts necessarily must operate rapidly. For this reason, it is necessary to move the bottom plate 50 to the right to close the shaping receptacle from the position it occupies, as shown in Figure 6, as soon as possible after the end 85 has fallen out of the device. Since rapid movement is required, at times the edge of the opening 55 in the plate 50 will strike the end 85 of the glass stream, throwing it to the right, as shown in Figure 6, to the position indicated by the broken lines. The purpose of the downwardly bent end 61 of the guiding plate 60 is to catch the end 85 of the glass when thus thrown to the side and direct it into the mold.

As explained before, if a pellet can be formed in the shaping receptacle of sufficient size to furnish a complete charge to the mold, the device is operated in a slightly different manner. When so used, the step indicated in Figure 5 is omitted. In other words, after a pellet of sufficient size has been formed with the device in the position shown in Figure 4, the cutting plate 28 is moved to the right to cut the stream, as shown in Figure 6, and the bottom plate 50 is moved to the left to allow the pellet to fall into the mold. The bottom plate 50 is then moved to the right to close the shaping receptacle, as shown in Figure 7, and the cutting plate 28 is again moved to the left, as shown in Figure 8, to permit the glass to again flow into the shaping receptacle to form a new pellet.

While the new pellet is being formed the molds are changed. In this method of operation it will be noted there is never a flow of glass directly from the furnace through the device into the mold.

In the methods of operation that we have shown we have not stated the exact speed of the moving parts, the exact sequence of motions, or the exact duration of time that the parts are in their different positions. It is obvious that these factors will depend, to a large extent, upon the particular conditions met in the actual use of the device. For example, the quality of glass used, its temperature, the size of the mold, and the particular shape of the article to be manufactured, will determine the exact method of operation of the device and the particular timing of its moving parts.

It is to be understood, therefore, that while we have shown or suggested but a few methods of operating our device, changes in its use and operation may be made; and, likewise, although we have shown but one construction, changes in design and arrangement may be made without departing from the spirit and scope of our invention as disclosed in the appended claims, in which it is our intention to claim all novelty inherent in our invention as broadly as possible, in view of the prior art.

What we claim as new and desire to secure by Letters Patent is:

1. In combination with means for supplying a continuous stream of molten material, a shaping receptacle located in the path of the stream, means for cooling the shaping receptacle, a mold located below the shaping receptacle, means located above and cooperating with the upper edge of the shaping receptacle for cutting the stream, means for opening and closing the bottom of the shaping receptacle, and means below the shaping receptacle, and above the mold for guiding the severed end of the stream into the mold.

2. In combination with means for supplying a continuous stream of molten material, a shaping receptacle located in the path of the stream, and means located above the shaping receptacle for cutting the stream comprising a plate provided with a funnel-shaped opening cut away at one side and having a cutting edge adapted to be brought into shearing relation with the upper edge of the shaping receptacle.

3. In combination with means for supplying a continuous stream of molten material, a shaping receptacle open at the bottom located in the path of the stream, means located above the shaping receptacle for cutting the stream comprising a plate provided with a funnel-shaped opening cut away at one side and having a cutting edge adapted to be brought into shearing relation with the upper edge of the shaping receptacle, and means for opening and closing the bottom of the shaping receptacle comprising a slidable plate with a hole substantially the same size as the opening at the bottom of the shaping receptacle.

4. In combination with means for supplying a continuous stream of molten material, a shaping receptacle located in the path of the stream, means for cooling the shaping receptacle, and means located above the shaping receptacle for cutting the stream comprising a plate provided with a funnel-shaped opening cut away at one side and having a cutting edge adapted to be brought into shearing relation with the upper edge of the shaping receptacle.

5. In combination with means for supplying a continuous stream of molten material, a shaping receptacle open at the bottom located in the path of the stream, means for cooling the shaping receptacle, means located above the shaping receptacle for cutting the stream comprising a plate provided with a funnel-shaped opening cut away at one side and having a cutting edge adapted to be brought into shearing relation with the upper edge of the shaping receptacle, and means for opening and closing the bottom of the shaping receptacle comprising a slidable plate with a hole substantially the same size as the opening at the bottom of the shaping receptacle.

6. The method of casting articles from a stream of molten material consisting of, shaping the depending end of the stream in a shaping receptacle to form a pellet, permitting the pellet to drop into a mold, permitting the stream to flow directly into the mold, and cutting and deflecting the stream above the pellet.

7. In combination with means for supplying a continuous stream of molten material, a stationary one piece shaping receptacle located in the path of the stream, means located above the shaping receptacle for severing and supporting the stream, and means for opening and closing the bottom of the shaping receptacle, said severing means and said opening and closing means being independently operable.

8. In combination with means for supplying a continuous stream of molten material, a stationary one piece shaping receptacle located in the path of the stream, means for cooling the shaping receptacle, means located above the shaping receptacle for severing and supporting the stream, and means for opening and closing the bottom of the shaping receptacle, said severing means and said opening and closing means being independently operable.

9. The method of casting articles from molten material which consists of, establishing a continuous stream of molten material, supporting said material and simultaneously cooling and forming the supported portion into a pellet, releasing said pellet from its support and permitting it to drop into a mould, allowing said stream to flow into said mould, severing and deflecting the stream near its source, and finally straightening and supporting the severed end of said stream to form a new pellet.

10. The method of casting articles from molten material which consists of, establishing a continuous stream of molten material, supporting said material and simultaneously cooling and forming the supported portion into a pellet, confining the portion of the stream immediately above said pellet, releasing said pellet from its support and permitting it to drop into a mould, allowing said stream to flow into said mould, severing and deflecting the stream near its source, and finally straightening and supporting the severed end of said stream to form a new pellet.

11. The method of casting articles from molten material consisting of, producing a continuous stream of molten material, shaping and cooling the depending end to form a pellet, cutting and deflecting the stream above the pellet, and permitting the pellet to drop into a mould.

In testimony whereof we have hereunto set our hands and seals this 27th day of April, 1920.

ALEXANDER L. SCHRAM. [L. S.]
SCOTT DAVIDSON. [L. S.]